United States Patent [19]
Kleiman

[11] Patent Number: 5,515,538
[45] Date of Patent: May 7, 1996

[54] APPARATUS AND METHOD FOR INTERRUPT HANDLING IN A MULTI-THREADED OPERATING SYSTEM KERNEL

[75] Inventor: Steven R. Kleiman, Los Altos, Calif.

[73] Assignee: Sun Microsystems, Inc., Mountain View, Calif.

[21] Appl. No.: 219,428

[22] Filed: Mar. 29, 1994

Related U.S. Application Data

[63] Continuation of Ser. No. 890,406, May 29, 1992, abandoned.

[51] Int. Cl.⁶ .................................................. G06F 9/46
[52] U.S. Cl. ............................................ 395/733; 395/650
[58] Field of Search ................................... 395/725, 700, 395/650, 375, 733, 734, 736, 737, 739, 742

[56] References Cited

U.S. PATENT DOCUMENTS

| | | | |
|---|---|---|---|
| 4,584,644 | 4/1986 | Larner | 395/650 |
| 5,179,702 | 1/1993 | Spix et al. | 395/650 |
| 5,182,811 | 1/1993 | Sakamura | 395/800 |
| 5,247,675 | 9/1993 | Farrell et al. | 395/650 |
| 5,283,904 | 2/1994 | Carson et al. | 395/725 |

OTHER PUBLICATIONS

"Real Time", A Publication of Lynx Real–Time Systems, Inc., vol. 4, No. 1.
"Scheduling Support for Concurrency and Parallelism in the Mach Operating System", D. Black, IEEE Computer.
"Operating System Concepts" 3rd Edition, A. Silberschatz et al., Addison–Wesley, Apr. 1991.
"Realtime Scheduling in SunOS 5.0", S. Khanna et al., Proceedings of the Winter '92 USENIX Conference.

*Primary Examiner*—Glenn A. Auve
*Attorney, Agent, or Firm*—Erwin J. Basinski

[57] ABSTRACT

The disclosed invention is a method and apparatus for use in handling interrupts in a data processing system where the kernel is preemptible, has real-time scheduling ability, and which supports multithreading and tightly-coupled multiprocessors. The invention more specifically provides a technique for servicing interrupts in a processor by means of kernel interrupt handler threads which service the interrupt from start to finish. For efficiency, the interrupt handler threads do not require a complete context switch unless the interrupt handler thread is blocked. The kernel makes use of preprepared interrupt handler threads for additional efficiency, and these interrupt handler threads are not subjected to inordinate delays caused by the phenomenon of interrupt priority inversion if they do become blocked.

20 Claims, 12 Drawing Sheets

TIGHTLY-COUPLED MULTIPROCESSOR SYSTEM

TIGHTLY-COUPLED MULTIPROCESSOR SYSTEM

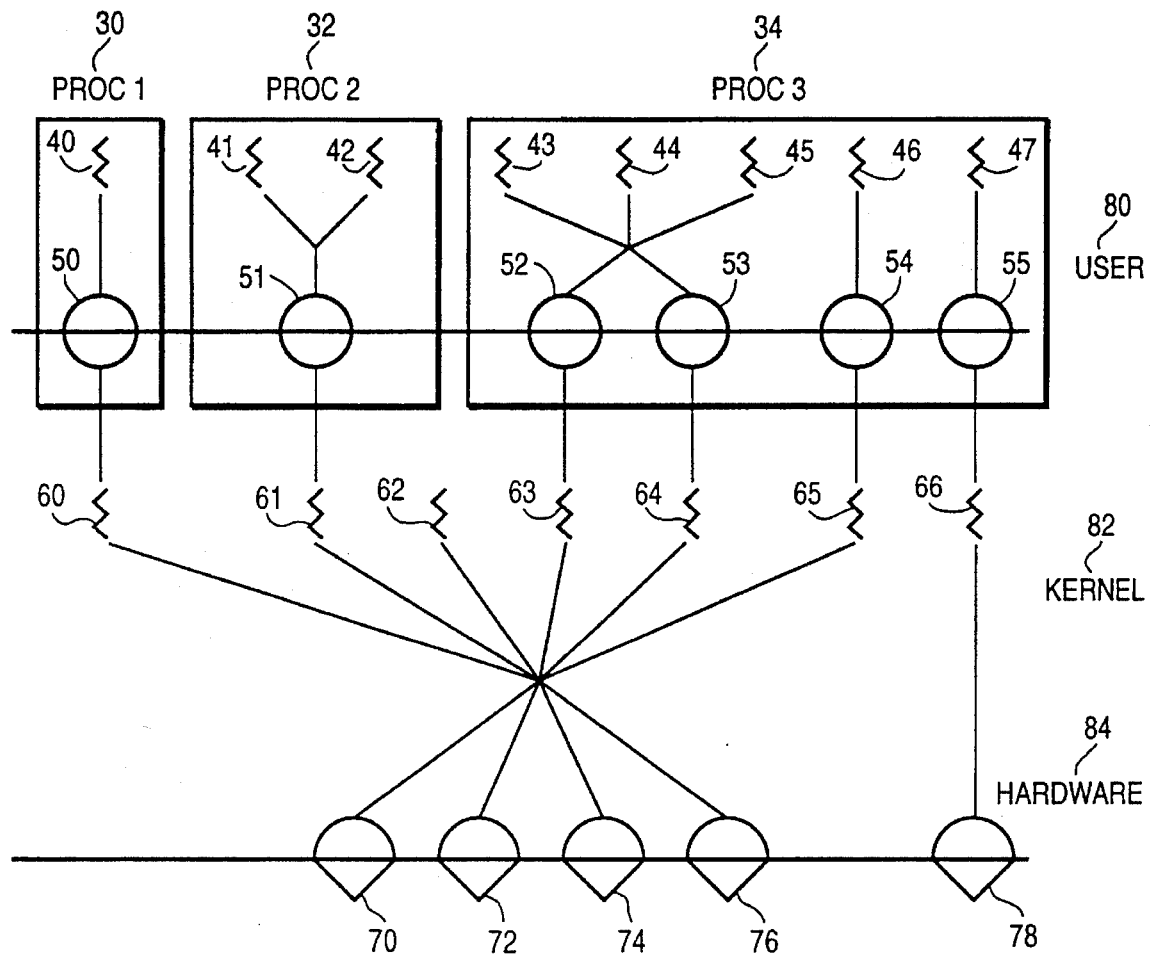
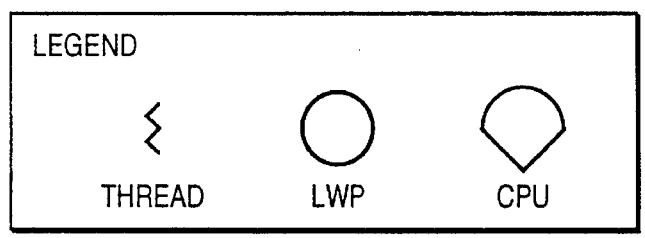
FIG. 2

(PRIOR ART)
PROCESS OF A TYPICAL INTERRUPT (PRIOR ART)
ILLUSTRATION OF NESTED INTERRUPTS

ILLUSTRATION OF NESTED INTERRUPTS
USING KERNEL INTERRUPT HANDLER THREADS

```
/* Mutual exclusion locks */
void    mutex_enter (kmutex_t *lp) ;
void    mutex_exit (kmutex_t *lp) ;

void    mutex_init (kmutex_t *lp,
                char *name,
                kmutex_type_t type, void *arg) ;
void    mutex_destroy (kmutex_t *lp) ;
int     mutex_tryenter (kmutex_t *lp) ;

/* condition variables */
void    cv_wait (kcondvar_t *cp,
                kmutex_t *lp) ;
int     cv_wait_sig (kcondvar_t *cp,
                kmutex_t *lp) ;
int     cv_timedwait (kcondvar_t *cvp,
                kmutex_t *lp, long tim)
void    cv_signal (kcondvar_t *cp) ;
void    cv_broadcast (kcondvar_t *cp) ;

/* multiple reader, single writer locks */
void    rw_init (krwlock_t *lp,
                char *name,
                krw_type_t type, void *arg) ;
void    rw_destroy (krwlock _t *lp) ;
void    rw_enter (krwlock_t *lp,
                krw_t rw) ;
int     rw_tryenter (krwlock_t *lp,
                krw_t rw) ;
void    rw_exit (krwlock_t *lp) ;
void    rw_downgrade (krwlock_t *lp) ;
int     rw_tryupgrade (krwlock_t *lp) ;

/* counting semaphores */
void    sema_init (ksema_t *sp,
                unsigned int val,
                char *name
                ksema_type_t type,
                void *arg) ;
void    sema_destroy (ksema_t *sp) ;
void    sema_p (ksema_t *sp) ;
int     sema_p_sig (ksema_t *sp) ;
int     sema_tryp (ksema_t *sp) ;
void    sema_v (ksema_t *sp) ;
```

KERNEL THREAD SYNCHRONIZATION INTERFACES

FIG. 5

INTERRUPT HANDLING

INTERRUPT HANDLING (CONTINUED)

INTERRUPT THREAD BLOCKING

RETURN FROM TRAP

RELEASE INTERRUPT

APPARATUS AND METHOD FOR INTERRUPT HANDLING IN A MULTI-THREADED OPERATING SYSTEM KERNEL

This is a continuation of application Ser. No. 07/890,406, filed May 29, 1992, now abandoned.

BACKGROUND OF THE INVENTION

1. Field of the Invention

The present invention relates to the fields of computer operating systems, multi-processor hardware systems, and object oriented programming. Specifically, the present invention is a method and apparatus for handling interrupts in an operating system kernel which may accommodate multi-threading and real-time processing.

2. Background

A computer system can be generally divided into four components: the hardware, the operating system, the applications programs, and the users. The hardware (the central processing unit (CPU), memory, and input/output (I/O) devices) provides the basic computing resources. The application programs (database systems, games, business programs, etc.) define the ways in which these resources are used to solve the computing problems of the users. The operating system controls and coordinates the use of the hardware among the various application programs for the various users. In doing so, the primary goal of the operating system is to make the computer system convenient to use. A secondary goal is to use the hardware in an efficient manner.

In attempting to meet these goals, operating system designs have evolved through systems allowing multiprogramming, time-sharing (also called multi-tasking), distributed systems and real-time systems. With multiprogramming, several jobs are kept in memory at the same time and the CPU is switched back and forth between them to maximize the use of the CPU and to decrease the overall time required to complete all jobs. Time-sharing is an extension of multiprogramming where the CPU is switched between jobs so frequently that users may continue to interact with the jobs but the CPU again optimizes the use of its time to process another job while waiting on users to respond. Real-time operating systems are often used for dedicated control devices but more recently are being required in business systems to accommodate multimedia and other time dependent requirements. A real-time operating system has well-defined fixed-time constraints, during which the system must perform the required tasks or the system will fail.

A more recent trend is to distribute computation among several processors, called generally multi-processor systems. In a "tightly coupled" system, the processors share memory and a clock. In such systems, communication between processors takes place through shared memory. In a "loosely coupled" system, each processor has its own memory and clock and the processors communicate with each other through various communication channels such as high-speed buses or telephone lines. These latter systems are usually called "distributed systems". For further description of operating systems in general see "Operating System Concepts" by A. Silberschatz, J. Peterson, and P. Glavin, Addison Wesley 1991.

The UNIX® Operating System is currently used on thousands of computer systems throughout the world. UNIX is a registered trademark of UNIX System Laboratories, Inc. UNIX was designed to be a simple time-sharing system, with a hierarchical file system, which supported multiple "processes." A "process" is the execution of a program and consists of a pattern of bytes that the CPU interprets as machine instructions (text), data, and stack. (A "stack" is a set of hardware registers or a reserved amount of main memory that is used for arithmetic calculations or for keeping track of internal operations. Stacks usually work on a last-in-first-out basis; the last item, or address, placed (pushed) onto the stack is the first item removed (popped) from the stack). Several processes may be instances of a single program. Processes communicate with other processes and the kernel via "system calls." A process can execute in both "user" mode and "kernel" mode and so has a separate stack for each mode. The "context" of a process or its "state" is defined as:

its text, values of global user variables and data structures, values of registers, values stored in its process table slot and "u area", and the contents of its user and kernel stacks.

The "process table" and "u area" are both data structures which describe the state of the process. Switching from user mode to kernel mode in the same process does not require a "context switch", however when switching from process "A" to process "B" a context switch must be made. A "context switch" requires the kernel to save all of the registers and values so that when a process is reinitiated it will resume from the spot where it was executing when an earlier context switch was made.

UNIX consists of two separable parts: the "kernel" and the "systems programs." Systems programs consist of system libraries, compilers, interpreters, shells and other such programs which provide useful functions to the user. The kernel provides the file system, CPU scheduling, memory management, and other operating-system functions by responding to "system calls". Conceptually, the kernel sits between the hardware and the users. System calls are the means for the programmer to communicate with the kernel. System calls are made by a "trap" to a specific location in the computer hardware (sometimes called an "interrupt" location or vector). Specific parameters are passed to the kernel on the stack and the kernel returns with a code in specific registers indicating whether the action required by the system call was completed successfully or not. For more detailed information on the UNIX operating system see "The Design of the UNIX Operating System" by Maurice J. Bach, Prentice-Hall, 1986.

The popularity of UNIX based systems and the rapid growth of technology place greater demands on systems designers and hardware vendors to build faster systems to handle accelerated true color graphics applications, including combined audio, video, graphics and text information in a single display (generally called "multimedia" applications), advanced telecommunications applications including voice processing which requires rapid processing, and other kinds of applications combining real-time requirements with the normal time-sharing demands. Attempts to meet these demands to date have included the implementation of distributed computer networks, faster uniprocessor systems, faster and more densely integrated tightly-coupled multiprocessor architectures, and methods to enhance user application processing such as multi-threading user processes.

Multiprocessor hardware availability allows applications to be restructured to make use of more than one processor (CPU) at a time. This requires additional control mechanisms to synchronize the different parts of an application which might be running simultaneously on two or more CPUs. Such new programming capabilities are generally embodied in the new programming paradigm called "multithreading." A "thread of control" or more simply a "thread" is a sequence of instructions being executed in a program. A thread has a program counter (PC) and a stack to keep track of local variables and return addresses. Threads execute independently. Threads share the process instructions and most of its data, as well as share most of the operating system state of a process. Each thread may make arbitrary system calls. Threads and the associated control and services of a multithreaded system (including synchronization services) may be implemented as objects. Synchronization techniques which are implemented as objects include mutual exclusion (mutex) locks, semaphores, condition variables, and readers/writer locks. For more information on multithreads as applied to application programs, see the paper titled "SunOS Multi-thread Architecture" by M. L. Powell, S. R. Kleiman, S. Barton, D. Shah, D. Stein, M. Weeks, Proceedings of the USENIX Conference-Winter '91—Dallas, Tex., pages 65–79. See also the aforementioned text by Silbershatz et al, at pages 96–97, and 597–629.

In the face of these new demands for multiprocessor support, control of concurrent processing, and support for real-time processing, the simple, time-sharing based UNIX kernel is incapable of supporting tightly-coupled multiprocessing or real-time processing demands. The original UNIX system protects the kernel data structures by two policies: the kernel cannot preempt a process and switch context to another process while executing in kernel mode, and it masks out interrupts when executing a critical region of code if an interrupt handler could corrupt kernel data structures. On a multiprocessor system, however, if two or more processes execute simultaneously in the kernel on separate processors, the kernel could become corrupt in spite of the protective measures that suffice for uniprocessor systems. New operating systems provide a redesigned kernel which can accommodate these requirements. Some of these designs extend the multithreading technique to the kernel, and this in combination with new synchronization techniques, priority setting mechanisms, task scheduling and dispatching rules, allows for maintaining the data integrity of all necessary structures, and the concurrency of simultaneously executing threads. Within such systems, the demands of real-time applications for predictable and bounded response to real-time stimuli, require the incorporation of unique interrupt handling techniques which minimize the overall response time to an interrupt triggering event. The unique design of the present invention provides interrupt handling procedures using kernel threads which satisfies these requirements.

In the present invention, the philosophy is to capture all asynchronous processing in the concept of a kernel thread. Interrupts, since they are a form of asynchronous processing, are handled as threads. While other systems break up the interrupt handling into a part that is a thread and a part that is a non-thread interrupt handler, the present invention executes the interrupt handling entirely as a thread. In order to do this efficiently, the invention delays expensive processing, such as context switching until it is absolutely necessary to do so. Moreover, additional processing efficiency is gained by the use of pre-prepared interrupt handler threads. By handling the entire interrupt as a thread, the remainder of the kernel can synchronize with these interrupt handler threads without locking interrupts out for an unbounded period of time. As a result, the periods that interrupts are locked out are few in number and bounded in time. In addition, synchronizing with interrupt handler threads does not require the raising and lowering of the CPU interrupt priority level, which also saves significant processing time.

As a result of using interrupt handler threads for the entire interrupt processing task, and as a result of the fact that these threads may be blocked by other threads, priority inversion is possible (i.e., a lower priority activity blocking a higher priority activity). However, in the present invention, such priority inversion is prevented by having the blocked thread give its dispatching priority level to the thread causing the block to insure that the blocking thread runs at the same high level as the blocked thread and does not get stuck behind other lower dispatch priority activities. The blocking thread is said to "inherit the priority" of the blocked thread. This approach provides the rapid and bounded response necessary to permit real-time processing in a multi-processing, multi-threaded environment.

Additional information concerning the implementation of the SunOS 5.0 Operating System may be found in the following articles: [Kleiman 1992] S. Kleiman, J. Voll, J. Eykholt, A. Shivalingiah, D. Williams, M. Smith, S. Barton, and G. Skinner, *Symmetric Multiprocessing in Solaris* 2.0, COMPCON Spring 1992, p181, San Francisco, Calif.; [Khanna 1992] Sandeep Khanna, Michael Sebree, John Zolnowsky, *Realtime Scheduling in SunOS* 5.0, USENIX, Winter 1992, San Francisco, Calif.

SUMMARY OF THE INVENTION

The disclosed invention is a method and apparatus for handling interrupts and is useful in a data processing system where the kernel is preemptible, has real-time scheduling ability, and which supports multiprocessors symmetrically. The invention more specifically provides a technique for servicing interrupts in a processor by means of kernel interrupt handler threads which do not require a complete context switch unless the interrupt handler thread is blocked, and which is not subjected to inordinate delays caused by the phenomenon of interrupt priority inversion. Moreover, the invention provides a technique for servicing the interrupt completely as a kernel interrupt handler thread without the need for a bounded device handler non-thread routine as part of the interrupt servicing.

According to the invention, these capabilities are accomplished by using a kernel interrupt handler thread to service an interrupt when it occurs. The entire interrupt servicing function is performed by the interrupt handler thread. Upon completion of servicing the interrupt, control may be returned to the interrupted thread or to the dispatcher for initiation of a thread with a higher dispatching priority.

In order to make the operation as efficient as possible, the interrupt handler thread uses only the minimum information from the interrupted thread with which to execute the interrupt service, and so long as the interrupt servicing is not blocked by a synchronizing activity, no full context switch is made.

If the interrupt handler thread is blocked before it can complete the service, only then is a complete context switch performed, saving the entire state of the interrupted thread. The interrupt handler thread then fills in any remaining interrupted thread information, puts itself on a sleep queue to await the completion of the blocking condition, at which time the sleeping interrupt handler thread will be made runnable again and will be eventually dispatched to complete the servicing of the interrupt which it began earlier.

In a particularly preferred embodiment of the invention, before putting itself on the sleep queue, the interrupt handler thread transfers its dispatching priority level to the thread which caused the block, in order to guarantee that the blocking thread will have a high enough priority level to prevent priority inversion (for example, where a lower level priority thread continues to block higher priority threads).

In order to accelerate the interrupt handling process, some interrupt handler threads may be prepared before they are needed and thus are available for use when an interrupt occurs.

DESCRIPTION OF THE DRAWINGS

The objects, features and advantages of the system of the present invention will be apparent from the following description in which:

FIG. 2 illustrates the general architecture of a multi-threaded, multi-processor system.

FIG. 5 shows the SunOS 5.0 Kernel Thread Synchronization Interfaces.

DESCRIPTION OF THE PREFERRED EMBODIMENT

The following disclosure describes solutions to problems which are encountered when attempting to implement interrupt handlers in tightly-coupled multiprocessor computer systems. The implementation described is a portion of the SunOS® 5.0 Operating System to be released under the name Solaris® 2.0 by Sun Microsystems®, Inc. Solaris and Sun Microsystems are registered trademarks, and SunOS is a trademark of Sun Microsystems, Inc. Reference may be made to the above referenced Technical Articles describing other features of the SunOS 5.0 multithreading, multiprocessing Operating System. A general understanding of the UNIX Operating System as described in the referenced text by Bach, as well as a general understanding of multithreading explained in the reference by Powell et al, is assumed. While this description of the present invention is made in terms of SunOS 5.0, it will be clear to those skilled in the art that the method and apparatus described herein may be implemented in various multi-threaded operating systems and in various configurations, or makes or models of tightly-coupled processors.

Figure 1:
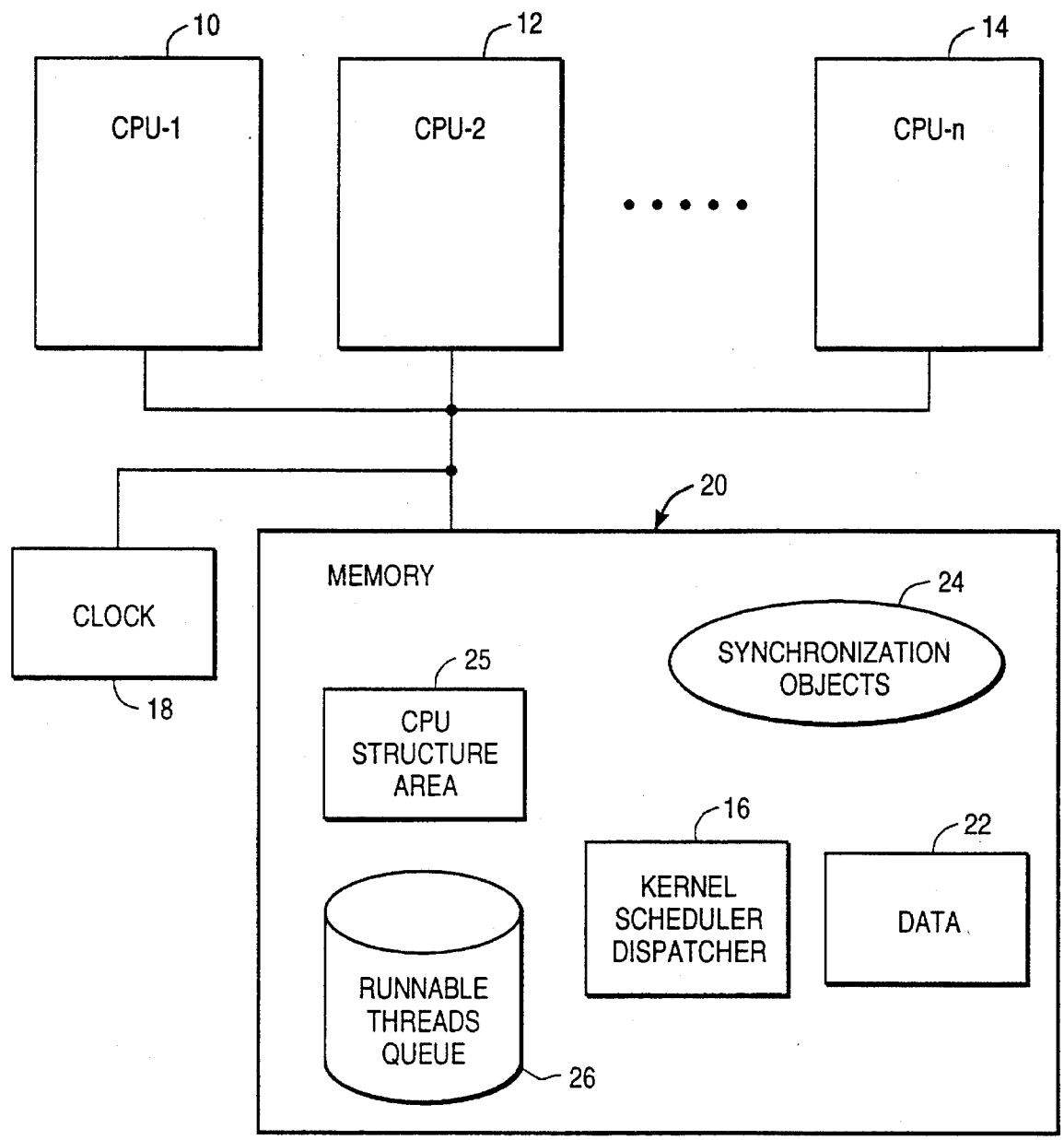
FIG. 1 illustrates a general architecture of a tightly-coupled multi-processor computer system.

SunOS 5.0 is intended to run on uniprocessors and tightly-coupled shared memory multiprocessor systems with one or more processors. Referring now to FIG. 1, the computer system is assumed to have one or more central processor units (CPUs) 10, 12, 14 sharing a memory 20 and clock 18. The kernel 16 assumes all processors are equivalent. Processors 10,12,14 execute kernel threads selected from the queue of runnable kernel threads 26. If a particular multiprocessor implementation places an asymmetric load on the processors (e.g., interrupts) the kernel 16 will nonetheless schedule threads to processors 10,12,14 as if they were equivalent. In general, all processors 10,12,14 see the same data in memory 20. This model is relaxed, somewhat, in that memory operations issued by a processor 10, 12, 14 may be delayed or reordered when viewed by other processors. In this environment, shared access to memory is preferably protected by synchronization objects 24. (The data locking mechanisms are also sometimes called synchronization variables or synchronization primitives). The exception is that single, primitive data items may be read or updated atomically (e.g. all the bytes in a word change at the same time). (A "word" is a four byte piece of data.) The shared memory 20 is assumed to be symmetrical. Thus the kernel 16 currently does not ensure that processes scheduled on a particular processor 10 (for example), are placed in a particular piece of memory 20 that is faster to access from that processor 10. It is possible for a kernel 16 to run "symmetrically" on a multiprocessor yet not allow more than one processor 10, 12, 14 to execute kernel code 16. This is clearly not a strategy that scales well with increasing numbers of processors, and in the preferred embodiment of the present invention, all of the processors 10,12,14 in the system can execute the shared kernel code 16 simultaneously, and use the data structures in the shared memory 20 to communicate between the processors 10,12,14 as required.

The "cpu structure area" 25 contains a data structure for each processor 10,12,14. These per-processor structures contain per-processor data, such as: currently executing thread, idle thread, current dispatching priority, and interrupt handling information.

SunOS 5.0 is designed with a relatively "fine grained" locking strategy to take advantage of as many processors 10, 12, 14 as possible. Each kernel subsystem has a locking strategy designed to allow a high degree of concurrency for frequent operations. In general, access to data items 22 are protected by locks as opposed to locking access to entire routines. Infrequent operations are usually coarsely locked with simple mutual exclusion. Overall, SunOS 5.0 has several hundred distinct synchronization objects 24 statically, and can have many thousands of synchronization objects 24 dynamically. Kernel threads synchronize via a variety of synchronization objects or primitives, such as:

Mutual exclusion (mutex) locks,

Condition variables,

Counting semaphores,

Multiple readers, single writer (readers/writer) locks.

The mutex and writer locks support a dispatching priority inheritance protocol which prevents lower priority threads from blocking higher priority threads (priority inversions).

Kernel threads represent the fundamental entities that are scheduled and dispatched on any of the CPUs in the system. A kernel thread is preferably very lightweight, having only a small data structure and a stack. When switching between kernel threads it is not necessary to change virtual memory address space information, so it is relatively inexpensive.

Kernel threads are fully preemptible and may be scheduled by any of the scheduling classes included with the system, including the real-time (fixed priority) class. Since all other execution entities are built using kernel threads, including, in the present invention, complete interrupt processing, they represent a fully preemptible, real-time "nucleus" within the kernel. "Preemption" is the action whereby a runnable thread with a higher dispatching priority may force a CPU to cease executing a thread with a lower dispatching priority in favor of executing the higher dispatching priority thread. In prior art UNIX operating systems the kernel allowed a process to preempt an already running process at only a very few selected times. In the preferred embodiment of the present invention, the kernel allows preemption at all but a very few short periods of time and the interrupt handling threads of the present invention are similarly preemptable.

Kernel threads synchronize using synchronization primitives that support protocols for preventing dispatching priority inversion, so a thread's priority is determined by which activities it is impeding by holding locks as well as by the service it is performing. Kernel threads are used to provide asynchronous kernel activity, such as asynchronous writes to disk, servicing STREAMS queues, and callouts. (A "STREAM" is a full-duplex connection between a process and a device driver, designed to provide flexibility and modularity for the I/O subsystem within a UNIX system.) This removes various diversions in the idle loop and trap code and replaces them with independently scheduled threads. Not only does this increase potential concurrency (these activities can be handled by other CPUs), but it also gives each asynchronous activity a priority so that it may be appropriately scheduled.

Referring now to FIG. 2, the relationship of a traditional single-threaded process 30 and multithreaded processes 32,34 to the user-level software 80, kernel 82, and processor hardware 84 in a multi-threaded system is illustrated. The multi-threaded programming model has two levels in the user-level software area 80: threads 40–47, and Light Weight Processes(LWPs) 50–55. In the multi-threaded paradigm, programmers write programs using threads (which may be thought of as independent program execution entities). A multi-threaded UNIX process can have several threads of control, which can run independently on different CPUs. User threads are implemented by the library and are not known to the kernel. To the kernel, the LWP is the execution part of a traditional UNIX process. LWPs are implemented by the kernel. User threads are implemented using LWPs in the following way: User threads are actually represented by data structures in the address space of a program. An LWP chooses a user thread to run by locating the user thread state in the program's memory. Loading the registers and assuming the identity of the user thread, the LWP executes the user threads instructions. If the user thread cannot continue, or if other user threads should be run, the LWP saves the state of the user thread back in memory. The LWP can now select another user thread to run. Because a user thread is implemented by an LWP, the capabilities of a user thread are the same as an LWP. When a user thread needs to access a kernel service by performing a system call, or to interact with user threads in other UNIX processes, it does so as an LWP. The user thread needing the system call remains bound to the LWP executing it until the system call is completed. If a user thread needs to interact with other user threads in the same program, it can do so without involving the operating system. Switching from one user thread to another occurs without the kernel knowing it. Just as the UNIX "stdio" library routines (fopen (), fread ()) are implemented using the UNIX system calls (open, read), the user thread interface is implemented using the LWP interface, and for many of the same reasons.

Returning again to FIG. 2, kernel threads 60–61, and 63–66 are associated with the LWPs 50–55. Kernel threads 60–66 represent the fundamental entities that are scheduled and dispatched on any of the CPUs 70,72,74, 76, 78 in the system. Like the LWP, a kernel thread may be very lightweight, having only a small data structure and a stack. The first Process 30 is the traditional UNIX process with a single thread 40 attached to a single LWP 50. The second Process 32 has threads 41 and 42 multiplexed on a single LWP 51 as in typical coroutine packages, such as SunOS 4.0 liblwp. The third Process 34 has several threads 43,44,45 multiplexed on a lesser number of LWPs 52,53 and has a thread 46 permanently bound to LWP 54, and in addition, the process 34 has asked the system to bind one of its LWPs 55 to a CPU 78. The bound and unbound threads 40–47 can still synchronize with each other both within each process 30,32, 34 and between processes 30, 32,34 in the usual way by means of mutex locks, condition variables, semaphores, or readers/writer locks. The kernel supports the execution of user LWPs by associating a kernel thread 60–61, 63–66 with each LWP 50–55. While all LWPs 50–55 have a kernel thread, not all kernel threads have an 5LWP. Note kernel thread 62 for example. This type of kernel thread 62, with no LWP associated, would be used for handling interrupts, executing STREAMS code or providing Network File System (NFS) service for example.

Kernel threads 60–66 represent a thread of control inside the kernel 82. They are scheduled to execute on the processors 70, 72, 74, 76, 78 available to the kernel 82 within the shared kernel address space. A kernel thread contains the following state:

a stack, a set of registers, a pointer to thread local storage, a state flag, a priority, a processor affinity mask.

Typically, the stack is used for thread local storage. Every thread logically has its own set of registers. The state flag indicates whether a thread is running or blocking. The priority is used for scheduling The processor affinity mask is used to restrict the thread to running on a subset of the available processors.

Thread creation is as follows:

```
kthread_id_t
thread_create (stk, stksize, proc, arg, len, pp, state, pri)
        caddr_t stk;
        int stksize;
        void (*proc) ( );
        caddr_t arg;
        int len;
        proc_t *pp;
        int state;
        int pri;
```

"thread_create ()" creates a new kernel thread having a stack of the specified size, at the specified address, a procedure entry point, and an argument to be passed to the procedure. It will return the ID of the new thread. The new thread will be in the state specified, and will be considered part of the process pointed to by "pp". It will have dispatching priority "pri". If the stack address is "Null", the stack will be dynamically allocated, and if the size is zero, the default size will be used. The argument to be passed to the newly created thread can be passed by value, in which case the "len" field should be zero, or by address, in which case the length field should be the size of the argument. This argument will be copied to a dynamically allocated area and the address of that area will be passed to the new thread's procedure entry point.

Thread exit is by void thread_exit ();

"thread_exit ()" terminates the current thread.

Generally, an "interrupt" is a signal that gets the attention of the CPU and is usually generated when input or output is required. For example, hardware interrupts are generated when a key is pressed or when the mouse is clicked. Software interrupts are generated by a program (or process or thread) requiring input or output or generally some service. When an interrupt occurs, control is transferred to the operating system, which determines what action is to be taken or generally what "interrupt service" is to be performed. The portions of the operating system which perform the specific interrupt service required is generally called the "interrupt handler".

In the preferred embodiment of the present invention, the kernel is responsible for handling interrupts, whether they result from hardware (such as from the clock or from peripheral devices), from a programmed interrupt (execution of instructions that cause the hardware to send an interrupt to any processor in the system), or from exceptions such as page faults. These interrupts may occur on any CPU, so the kernel must handle these interrupts on any processor. In the general case, if the CPU is executing a thread with a lower CPU interrupt priority level than the priority level of the interrupt, the CPU accepts the interrupt before decoding the next instruction and raises the CPU interrupt priority level, so that no other interrupts of that priority level or lower can happen while it handles the current interrupt. The kernel can raise the interrupt priority level while accessing data structures also used by the interrupt handlers for that level or lower, to preserve the integrity of these data structures.

Figure 3:
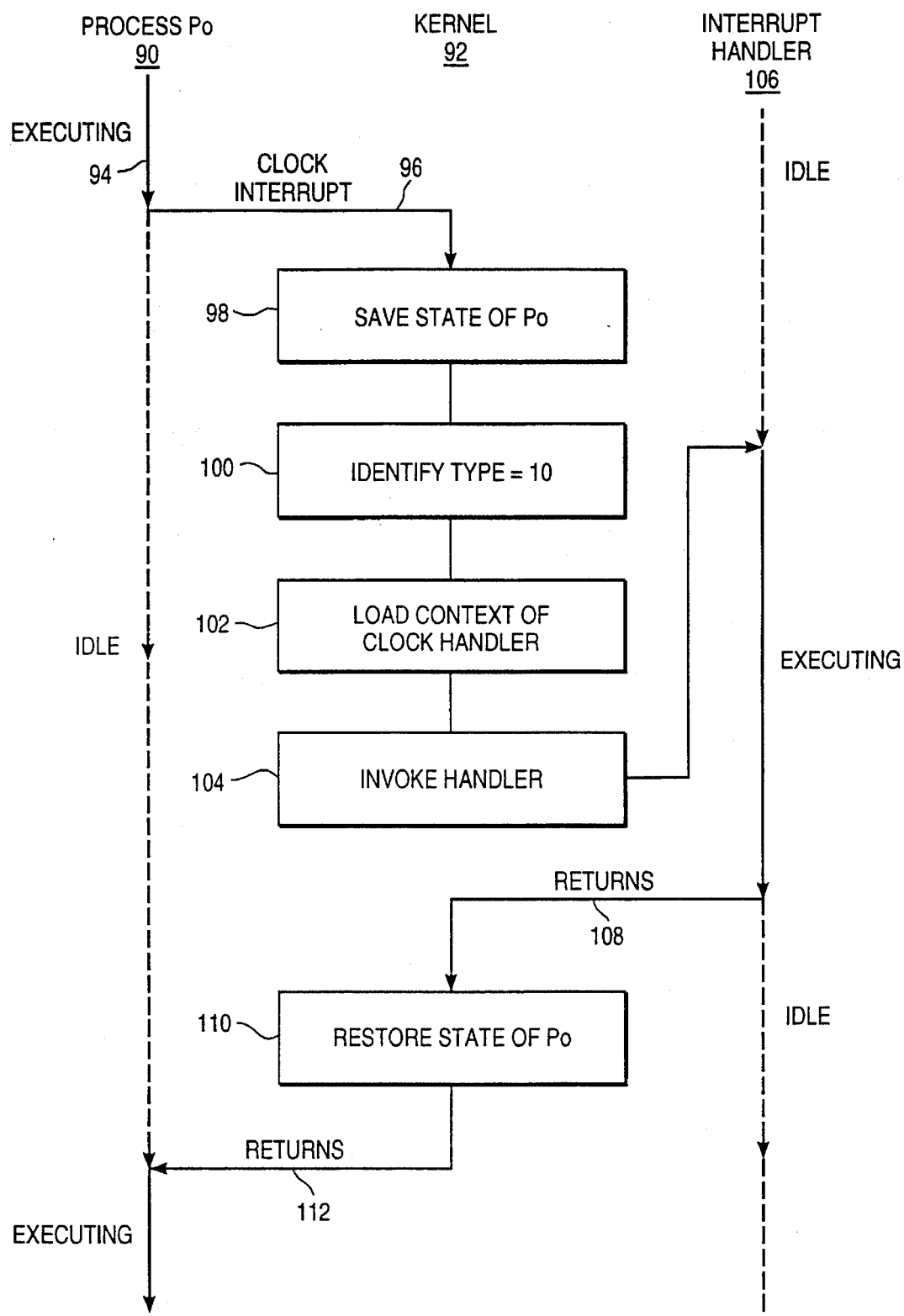
FIG. 3 illustrates graphically how a typical interrupt is handled in the prior art.

This general interrupt handling procedure in the prior art is now illustrated. Referring to FIG. 3, a kernel 92 generally handles an interrupt with the following steps:

1. It saves the current register context 98 of the executing process $P_0$ 90 and creates (pushes) a new context layer onto the kernel stack of the user process, or onto a special stack for interrupts.

2. It determines the cause of the interrupt, identifying the type (such as clock or disk) and the unit number of the interrupt, if applicable (such as which disk drive caused the interrupt). When the system gets an interrupt, it usually gets a number which is associated with the address of the handler (service routine) for that type of interrupt. These numbers depend on the configuration of the system (i.e. what devices are attached). A typical configuration might be as follows:

| Number | Device or Interrupt Type |
|---|---|
| 1 | Software or inter-processor interrupts |
| 4 | SCSI Channel interrupt (disk, tape, cdrom drives) |
| 6 | ethernet interface interrupt |
| 10 | clock interrupt (every 10 ms) |
| 12 | serial communication ports |
| 13 | "cross-call" interrupts from other CPUs |
|  | also floppy driver "pseudo-DMA" interrupt |
| 14 | profiling timer interrupt |
|  | also audio "pseudo-DMA" interrupt |
| 15 | Hardware error interrupts (parity error in memory) |

In this case if the clock interrupts the system 96, the kernel 92 gets interrupt number 10 100 from the hardware, loads the context of the clock handler 102 and invokes the clock interrupt handler 104.

3. Then the interrupt handler begins executing to perform the service required by the clock interrupt.

4. The interrupt handler completes its work and returns 108. The kernel 92 executes a machine-specific sequence of instructions that restores the register context and kernel stack of the process $P_0$ 110, and returns control 112 to $P_0$, which resumes execution from the point at which the interruption occurred.

Figure 4A:
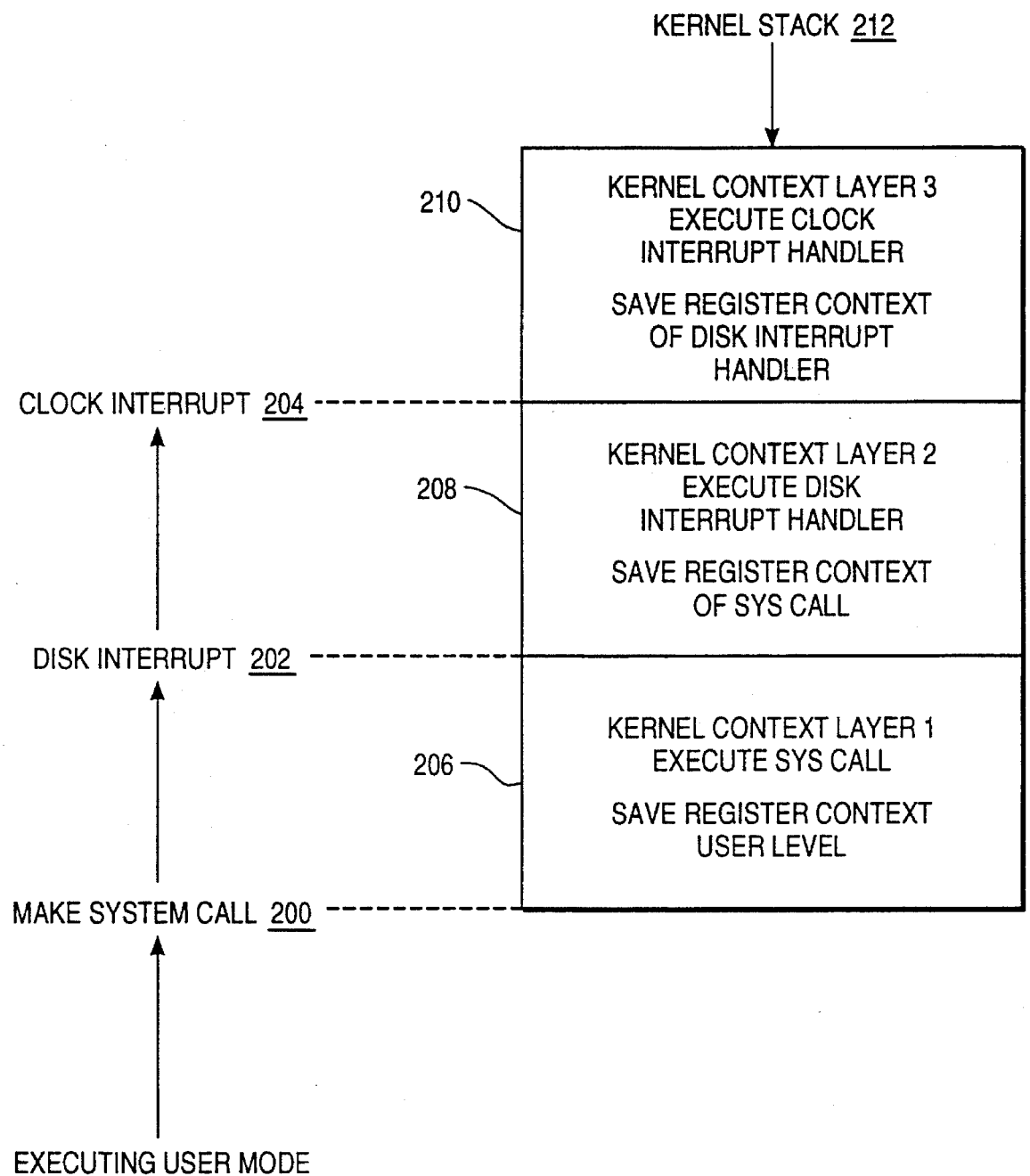
FIG. 4a illustrates an example of nested interrupts in the prior art.

If nested interrupts are allowed, interrupt handlers can become interrupted by higher level interrupts. FIG. 4a illustrates an example where a process or thread issues a system call 200, and the kernel has saved the context of the interrupted user level process 206 in the kernel stack 212, and receives a disk interrupt 202 while executing the system call. The disk interrupt 202 causes the kernel to save the system call handler context 208 in the stack 212. The kernel gives control to the disk interrupt handler and it is interrupted by the clock interrupt 204. As before, the kernel saves the context of the Disk interrupt handler 210 and gives control to the clock interrupt handler. As each handler finishes its work and returns, the kernel pops the previous context from the stack 212 and allows them to continue their process.

Figure 4B:
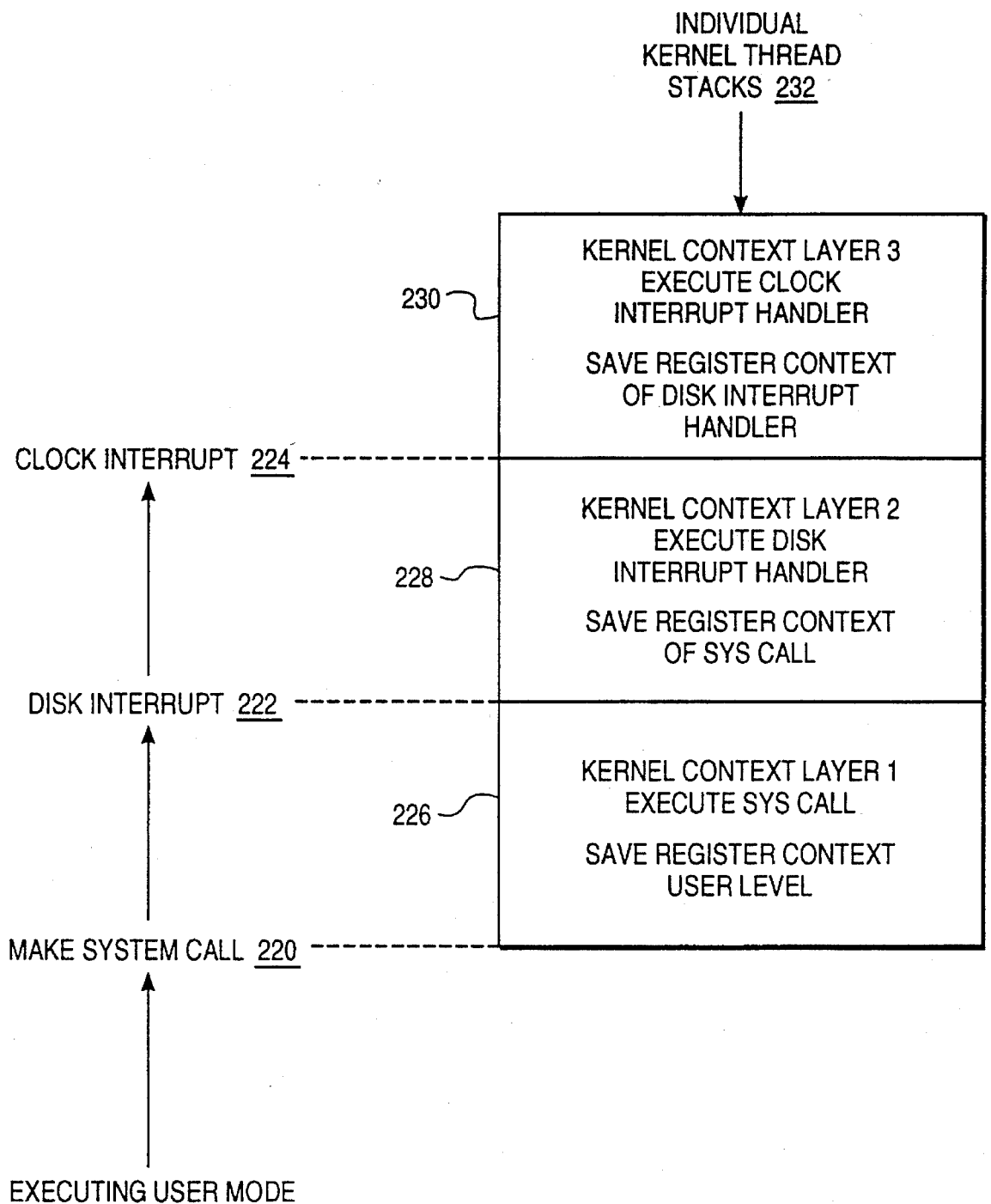
FIG. 4b illustrates the same nested interrupts using individual thread stacks.

In the preferred embodiment of the present invention, interrupts are handled by kernel threads. FIG. 4b illustrates the same sequence of nested interrupts but showing that each interrupt handler thread has its own stack 226, 228, 230 on which the relative contexts are saved. The kernel synchronizes with interrupt handler threads via normal thread synchronization objects. If an interrupt handler thread encounters a locked synchronization variable, the interrupt handler thread blocks and allows the critical section to clear. As a result, in the presently preferred embodiment, all interrupt handler threads are separately schedulable and each may sleep if blocked.

UNIX System V Release 4 (SVR4), upon which SunOS 5.0 is based, provides for several scheduling classes. A scheduling class determines the relative dispatching priority of processes or threads within the class, and then converts that priority to a global dispatching priority. The dispatcher chooses the process with the highest global dispatching priority and runs it. With the addition of multithreading in SunOS 5.0, the scheduling classes and dispatcher operate on threads instead of processes. The scheduling classes currently supported are system, timesharing, and real-time (fixed-priority).

The dispatcher chooses the thread with the greatest global dispatching priority to run on a CPU. If more than one thread has the same dispatching priority, they are dispatched in round-robin order. If there is more than one CPU, each one uses the dispatcher to find the highest priority runnable thread that is not already being run on another CPU.

The kernel has been made preemptible to better support the real-time class and interrupt threads. Preemption is disabled only in a small number of bounded sections of code relating to the scheduler dispatcher. This means that a runnable thread runs as soon as is practical after its dispatching priority becomes high enough. For example, when thread A awakens thread B, if thread B has a better dispatching priority, the running thread A will put itself back on the run queue and allow the CPU to run thread B. On a multiprocessor, if thread A has better dispatching priority than thread B, but thread B has better priority than the current thread on another CPU, then that CPU will be directed to preempt its current thread and choose the best thread to run. In addition, user code run by an underlying kernel thread of sufficient dispatching priority (e.g. real-time threads) will execute, even though threads that were executing lower priority kernel or application code wait for execution resources.

Synchronization Architecture.

The SunOS 5.0 kernel implements the same synchronization objects for internal use as are provided by the user level libraries for use in multithreaded application programs described in the aforementioned paper by Powell et al. These are mutual exclusion locks (mutexes), condition variables, semaphores, and multiple readers, single writer (readers/writer) locks. The interfaces are shown in FIG. 5. (Note that kernel synchronization primitives must use a different type name than user synchronization primitives so that the types are not confused in applications that read internal data structures.) These are all implemented in an object oriented fashion, in that the behavior of the synchronization object is specified when it is initialized.

Interrupts as Threads.

Many implementations of threads have a variety of synchronization primitives that have similar semantics (e.g., mutual exclusion) yet explicitly sleep or spin for blocking. When a synchronization primitive "spins" for blocking, it loops continuously until a value in memory changes. For mutexes, the spin primitives must hold interrupt priority high enough while the lock is held to prevent any interrupt handlers that may also use the synchronization object, from interrupting while the object is locked and deadlocking. The interrupt level must be raised before the lock is acquired and then lowered after the lock is released.

This has several drawbacks. First, the raising and lowering of interrupt priority can be an expensive operation, especially on architectures that require external interrupt controllers (especially where mutexes are heavily used). Secondly, in a modular kernel, such as SVR4, many subsystems are interdependent. In several cases (e.g., mapping in kernel memory or memory allocation) these requests can come from interrupt handlers and can involve many kernel subsystems. This in turn, means that the mutexes used in many kernel subsystems must protect themselves at a relatively high priority from the possibility that they may be required by an interrupt handler. This tends to keep interrupt priority high for relatively long periods and the cost of raising and lowering interrupt priority must be paid for every mutex acquisition and release. Lastly, interrupt handlers must live in a constrained environment that avoids any use of kernel functions that can potentially sleep, even for short periods.

To avoid these drawbacks, the SunOS 5.0 kernel of the present invention treats most interrupts as asynchronously created and dispatched high priority threads. This enables these interrupt handler threads to sleep, if required, and to use the standard synchronization primitives.

On most architectures, putting threads to sleep must be done in software and this must be protected from interrupts if interrupts are to sleep themselves or wakeup other threads. The restructured kernel of the present invention uses a primitive spin lock protected by raised priority to implement this. This represents one of a few bounded sections of code where interrupts are locked out. Traditional kernel implementations also protect the dispatcher by locking out interrupts, usually all interrupts. The restructured kernel of the present invention has a modifiable level (the "thread level") above which interrupts are no longer handled as threads and are treated more like non-portable "firmware" (e.g. simulating direct memory access (DMA) via programmed I/O). These interrupts generally handle serial input and programmed I/O to the floppy drive and audio interfaces and are more timing critical. The related interrupt handler threads can only synchronize using the spin variants of mutex locks and software interrupts. If the "thread level" is set to the maximum priority, then all interrupts are locked out during dispatching. For implementations where the "firmware" cannot tolerate even the relatively small dispatcher lockout time, the "thread level" can be lowered. Typically this is lowered to the same level as the interrupt level at which the scheduling clock runs.

Implementing Interrupts as Threads.

Previous versions of SunOS have treated interrupts in the traditional way. When an interrupt occurs the state of the interrupted process is saved and it is held captive (pinned) until the interrupt returns. Typically, interrupts are handled on the kernel stack of the interrupted process or on a separate interrupt stack. The interrupt handler must complete execution and get off the stack before anything else is allowed to run on that processor. In these systems the kernel synchronizes with interrupt handlers on a processor by blocking out interrupts while in critical sections.

In the present invention as implemented in SunOS 5.0, interrupts behave like asynchronously created threads. Interrupts must be efficient, so a full thread creation for each interrupt is impractical. Instead, interrupt threads are preallocated, already partly initialized, with a number of these preallocated interrupt threads set aside for each CPU. When an interrupt occurs, the minimum amount of work is done to move onto the stack of an interrupt handler thread without doing a complete context switch, and to set it as the current thread. At this point the interrupt handler thread is not yet a full fledged thread (it cannot be descheduled) and the interrupted thread is pinned until the interrupt handler thread returns or blocks, and cannot proceed on another CPU. When the interrupt handler thread returns, the state of the interrupted thread is restored.

This preallocation of interrupt handler threads has a cost in terms of memory usage. Currently an interrupt handler thread is preallocated for each potentially active interrupt level below the thread level for each CPU. There are nine interrupt levels on the SunOS 5.0 implementation that can potentially use threads. An additional interrupt handler thread is preallocated for the clock (one per system). Since each thread requires a stack and a data structure, perhaps 8K bytes or so, the memory cost can be high. However, it is unlikely that all interrupt levels are active at any one time, so it is possible to have a smaller pool of interrupt handler threads on each CPU and block all subsequent interrupts below the thread level when the pool is empty, essentially limiting how many interrupts may be simultaneously active.

Interrupts may nest. An interrupt handler thread may itself be interrupted and be pinned by another interrupt handler thread with a higher interrupt priority.

If an interrupt handler thread blocks on a synchronization variable (e.g., mutex or condition variable), it completes the saving of the context (passivates) of the pinned thread, making it runnable by any CPU. Then the interrupt handler thread fills in any remaining thread state information that is required and saves the interrupt handler threads context. Thus most of the overhead of creating a full thread is only done when the interrupt must block, due to contention.

While an interrupt handler thread is in progress, the interrupt priority level it is handling, and all lower-priority interrupts must be locked-out. This is managed by the normal interrupt priority mechanism unless the interrupt handler thread blocks. If it blocks, these locked-out interrupts must remain disabled in case the interrupt handler thread is not reenterable at the point that it blocked or it is still doing high priority processing (i.e. should not be interrupted by lower priority work). While it is blocked the interrupt handler thread is bound to the CPU it started on as an implementation convenience and to guarantee that there will always be an interrupt handler thread available when an interrupt occurs. A flag is set in the CPU structure indicating that an interrupt at that level is blocked, and the minimum interrupt priority level is noted. Whenever the interrupt priority (spl) level changes, the CPU's base spl level is checked, and the actual interrupt priority level is never allowed to be below that spl value.

There is also an interface, release_interrupt(), which allows an interrupt handler thread to lower the interrupt priority level and continue as a normal, high priority thread. This is done by passivating the pinned thread and then lowering the interrupt priority level.

An alternative approach to this is to use bounded first-level interrupt handlers to capture device state and then wake up an interrupt thread that is waiting to do the remainder of the servicing. [See David Barnett, *Kernel Threads and their Performance Benefits*, Real Time, Vol. 4. No. 1, Lynx Real Time Systems, Inc. Los Gatos, Calif., 1992]. This approach has the disadvantages of requiring device drivers to be restructured and of always requiring a full context switch to the second level thread. The approach of the present invention used in SunOS 5.0 allows full thread behavior without restructured drivers and without the cost of doing a full context switch in the usual case where the interrupt handler does not have to block.

Figure 6:
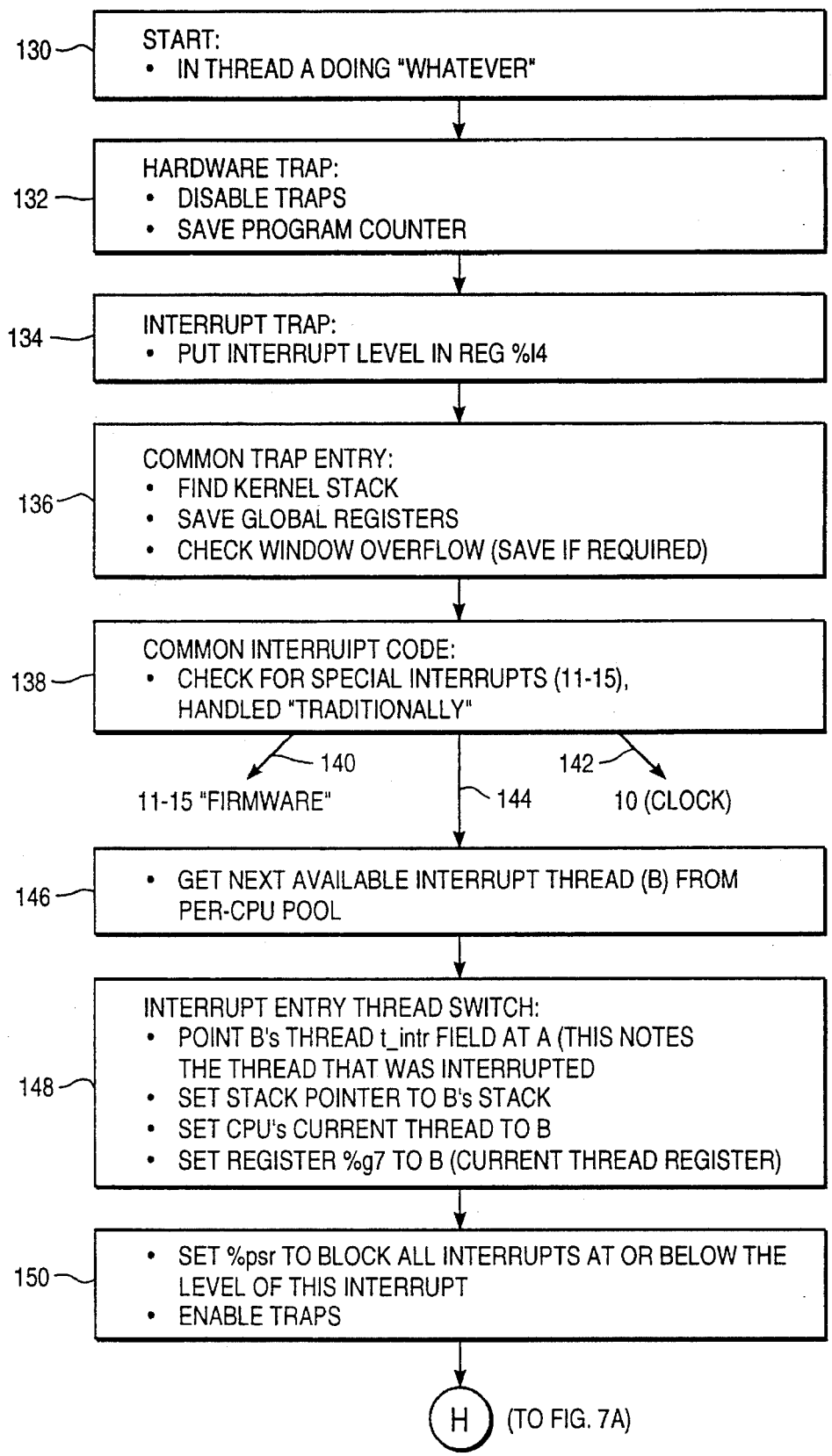
FIGS. 6, 7a, 7b, 8, 9 and 10 show a detailed flow chart of the interrupt handling procedure of the present invention.

The method of the present invention described above is now illustrated in more detail as implemented in SunOS 5.0 on the SPARC® architecture based computer systems of Sun Microsystems, Inc. (SPARC is a registered trademark of SPARC International Inc.). While the following exemplary description of the method and apparatus of the present invention is illustrated in terms of SunOS 5.0 and SPARC it will be understood that the invention may be practiced on other hardware architectures and in other operating systems. Referring to FIG. 6, it is assumed that a thread A is running 130 in one of the CPUs. When a hardware trap occurs 132, all traps are disabled, and the program counter is saved. The interrupt priority level is put into register "%14" 134, and the common trap entry is executed 136. The kernel stack of thread A (the interrupted thread) is found and the global registers are saved without doing a complete context switch. Window overflow is checked and saved if required. ("Window overflow" occurs if the current window counter points to an invalid window). Next the common interrupt code 138 is executed which checks to see what kind of interrupt occurred. If it is a clock interrupt, this is handled by a special routine 142 described below. If it is an interrupt numbered 11 through 15 140 (for example, an interrupt from a serial communication port (#12), a "cross-call" from another CPU or from the floppy drive (#13), from the profiling timer (#14), or from a hardware error (#15)), these are handled in the traditional way because these are generally time-critical and can not be permitted to be blocked by the dispatcher. If the interrupt type is any other number 144 then the kernel gets the next available interrupt handler thread (Thread B) from the pool of pre-prepared interrupt handler threads for the CPU which was interrupted 146. Thread B's thread state information is modified 148 by setting Thread B's field "t_intr" to point to thread A (denoting the thread that was interrupted); by setting the kernel stack pointers to point to thread B's stack; by setting the interrupted CPU's "current thread" to B; and by setting the "current thread register % g7" to B. In addition, register "% psr" is set to block all interrupts at or below the level of this interrupt, and the traps are re-enabled. 150

Figure 7A:
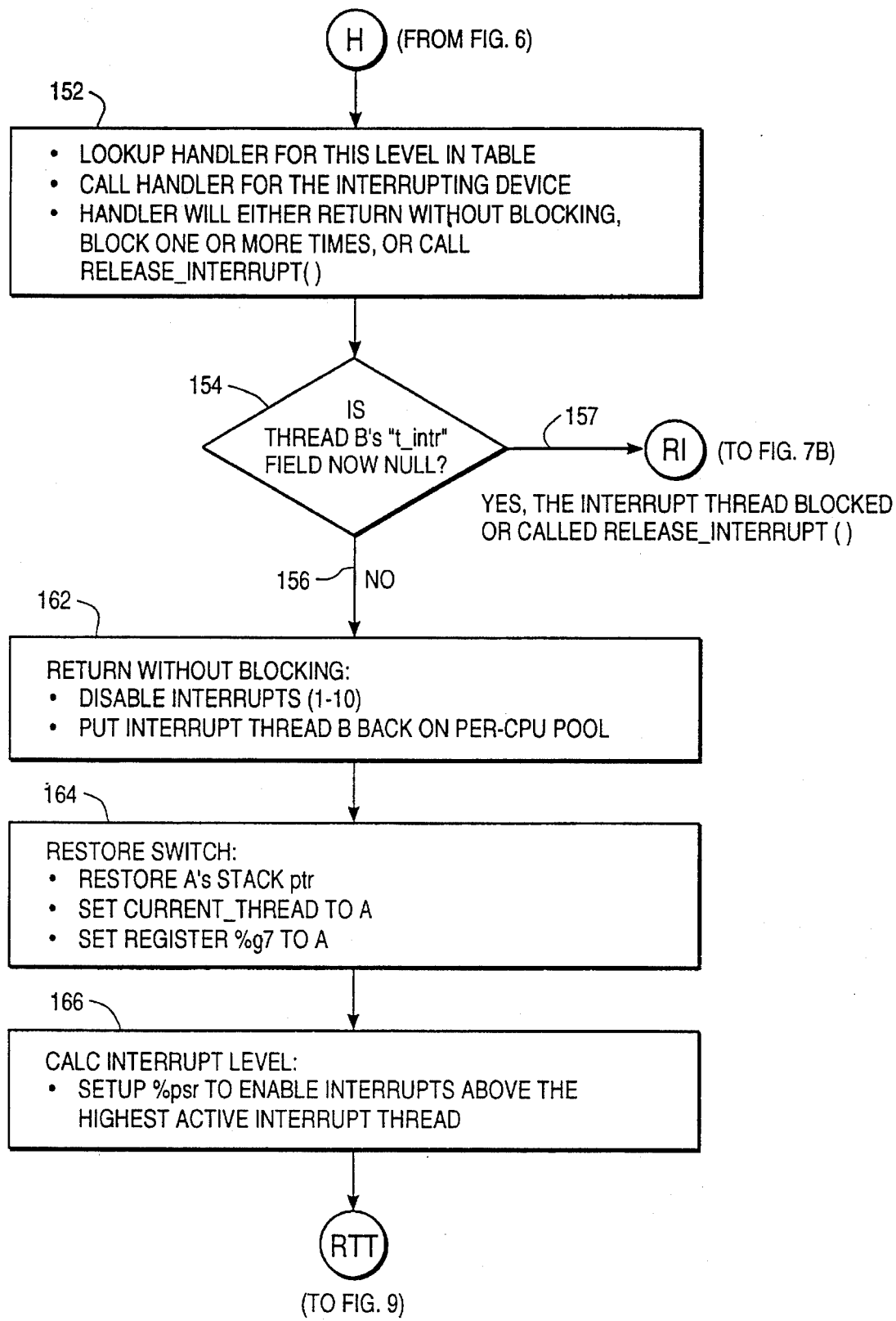
Figure 7B:
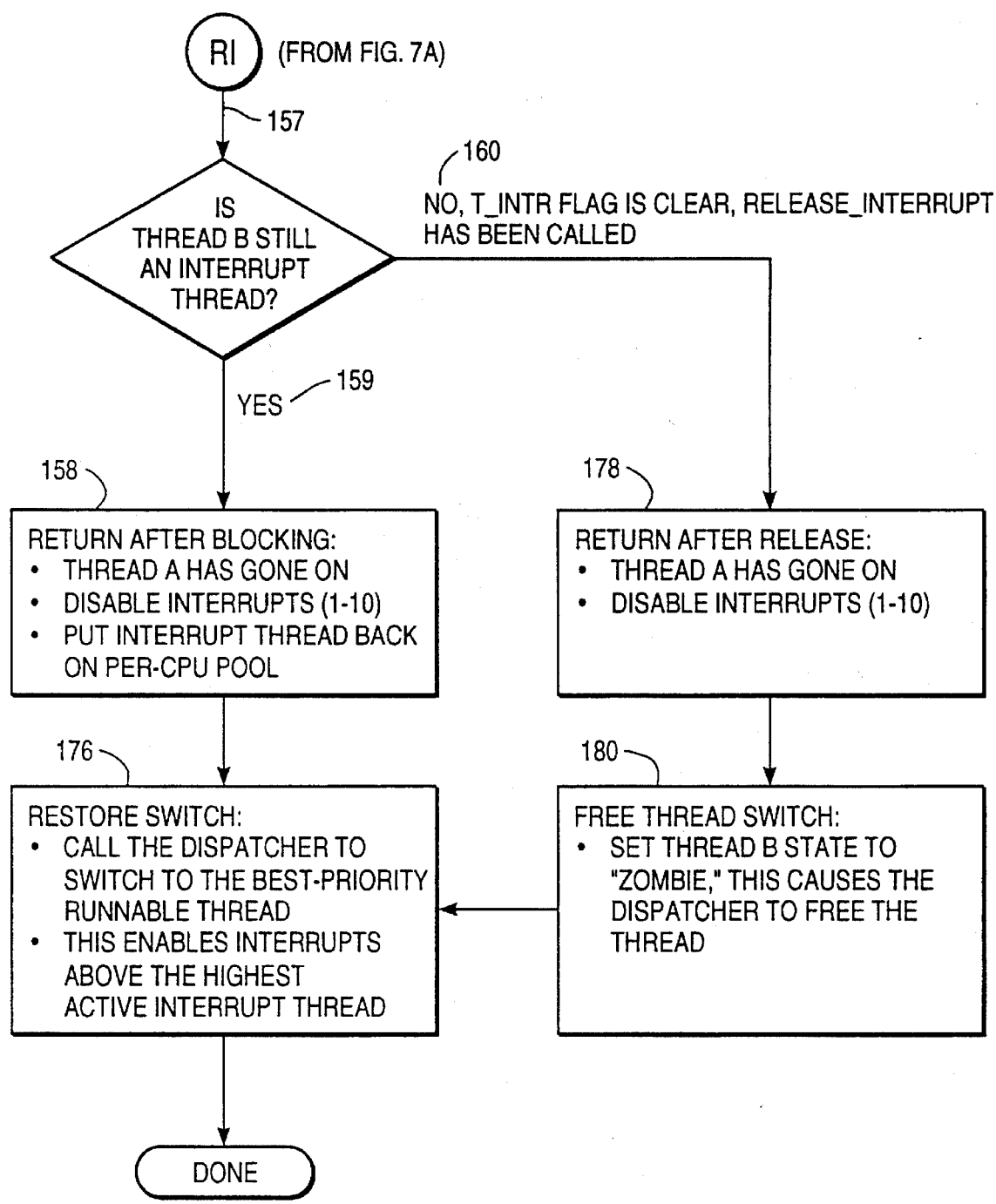

Continuing the description of the preferred embodiment of the interrupt handling procedure of the present invention, refer now to FIG. 7a. Having made the initial register and pointer settings as described above to permit Thread B to handle the interrupt without yet having to make a complete context switch, Thread B looks-up the handler for the specific type of interrupt that occurred and calls that handler. 152 This handler will begin executing and will either return without having been blocked, will block and be unblocked one or more times before returning, or will call "release_interrupt ()" and will return thereafter 154. Thread B's "t_intr" field is tested and if it is NULL the interrupt handler thread has blocked or called "release_interrupt ()" 157. If thread B's field "T_INTR_THREAD" flag is not clear thread B did not call "release_interrupt ()" and is still an interrupt handler thread (159 on FIG. 7b).

Figure 9:
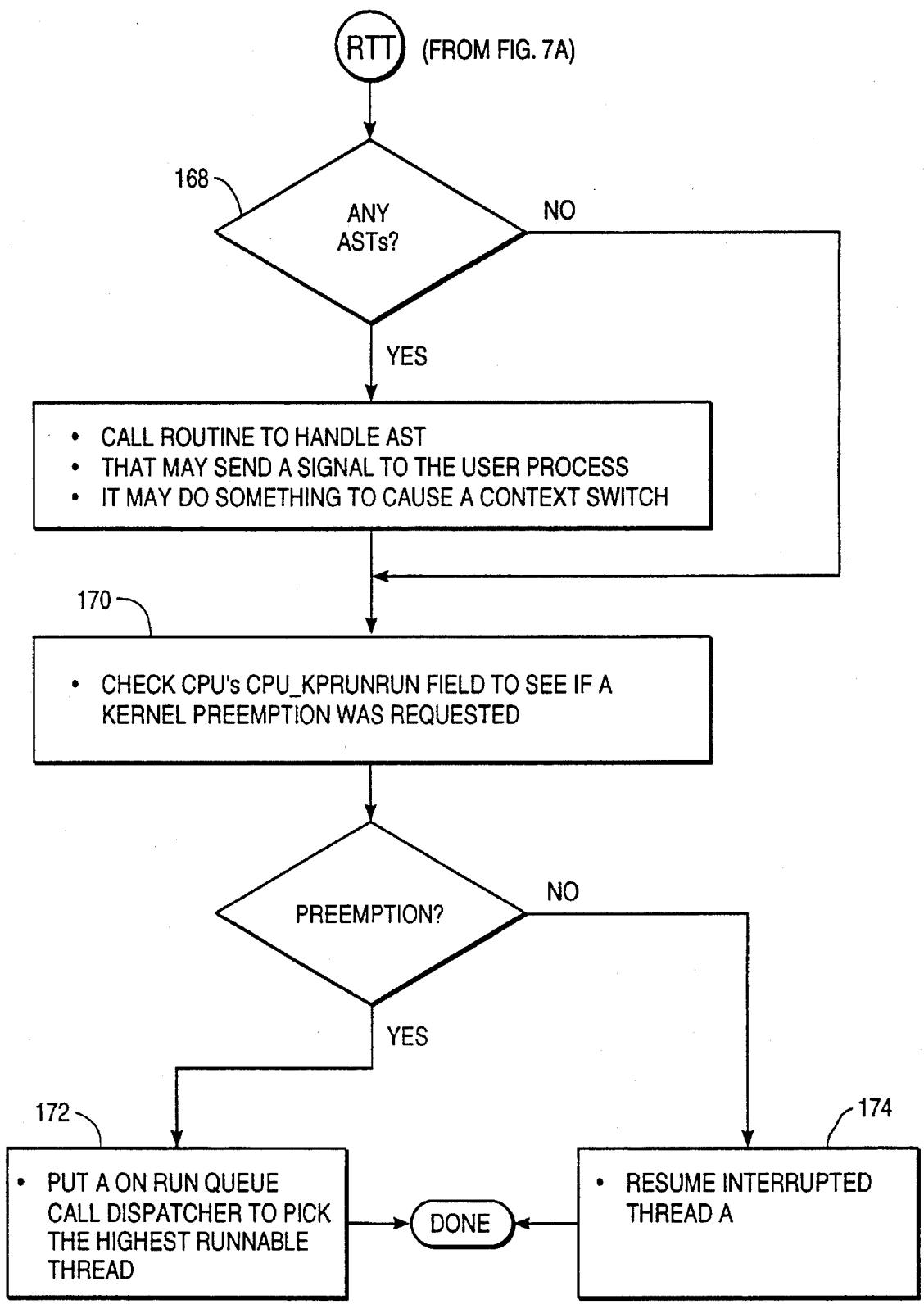

Referring again to FIG. 7a, in most cases the interrupt handler thread (thread B) will return without having been blocked 156. At the return from the interrupt handler thread 162, interrupts 1–10 are disabled while the interrupted thread A's registers are restored (that is, A's stack pointer is restored; "current_thread" is set to A; and register "% g7" is set to A) 164. The kernel also puts the interrupt thread B back onto the pre-prepared interrupt handler thread pool for the interrupted CPU 162, and resets the register "% psr" to enable interrupts above the highest active interrupt thread. 166 Referring now to FIG. 9, the kernel then checks to see if there are any "asynchronous software traps" (AST's) waiting 168. If so, the kernel will process these without doing a context switch of thread A and when completed (or if no ASTs were waiting) the kernel will then check the "cpu_kprunrun" field in the CPU structure to see if a runnable thread with dispatching priority level higher than thread A is waiting to run 170. If so, a context switch of thread A will be completed and thread A will be placed on the runnable queue, and control transferred to the dispatcher to initiate the highest priority thread 172. If there is no waiting thread with a dispatching priority higher than thread A, then control is transferred to resume thread A 174.

Figure 8:
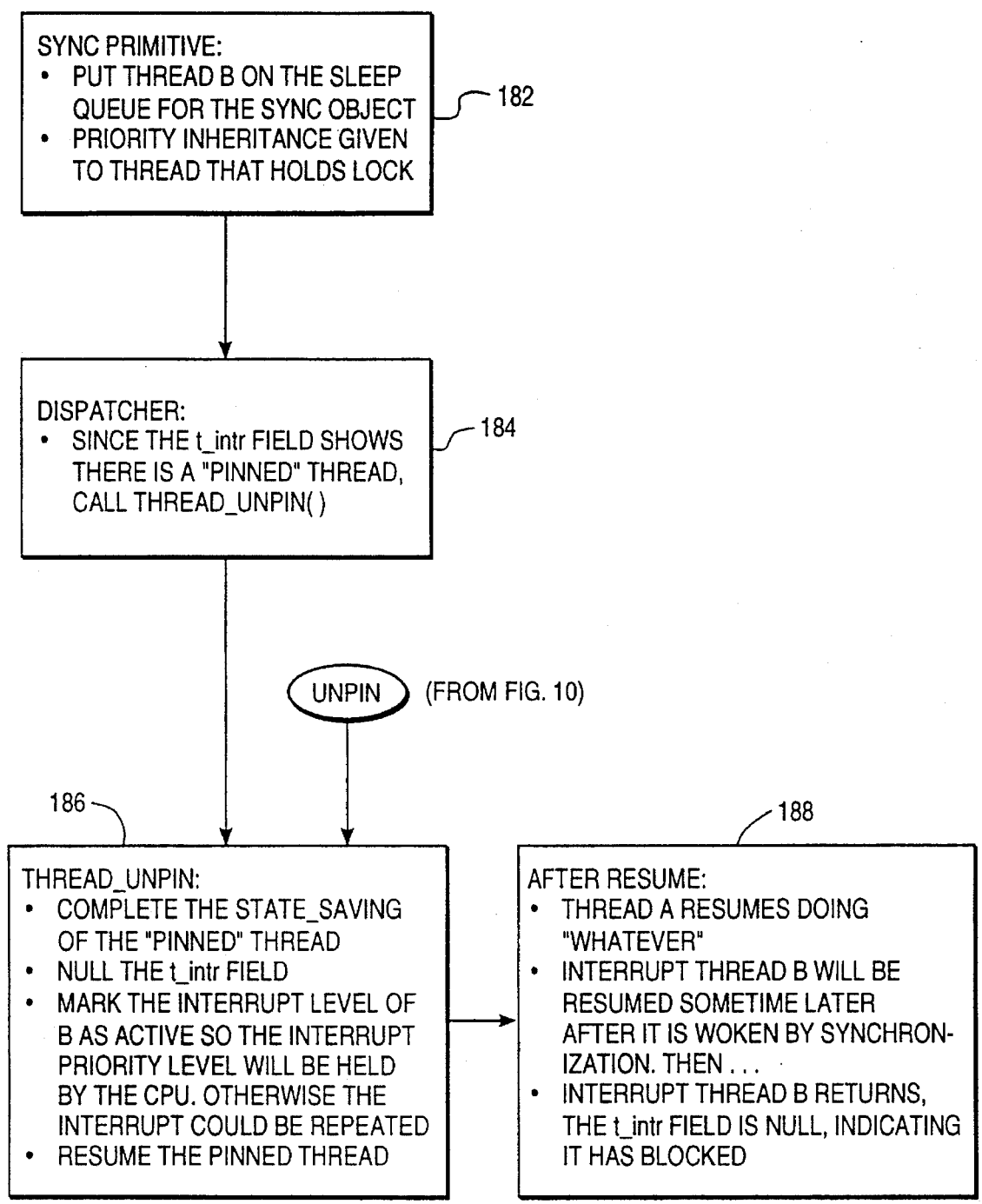

If the interrupt handler thread (thread B) does block (i.e. become blocked) because of some synchronizing condition, the processing which occurs is shown in FIG. 8. Referring to FIG. 8, the kernel puts the blocked thread B on the sleep queue of the synchronizing object related to the thread that is causing the block; and gives the dispatching priority level of the blocked interrupt handler thread B to the thread causing the block 182. This is called "priority inheritance" and insures that the blocking thread will run as soon as possible. Then the kernel transfers control to the dispatcher who sees that its register "t_intr" shows that thread A is pinned. As a result, the dispatcher calls "thread_unpin" 184. "Thread_unpin" completes the context switch of thread A (the "pinned" thread); "Nulls" the "t_intr" field of thread B; marks the interrupt level of the blocked interrupt thread B in the "cpu_intr_active" field in the CPU's cpu structure, so that the interrupt priority level will be held by the interrupted CPU; and control is transferred to the dispatcher to initiate the highest priority thread. This is usually the blocking thread 186. At this point the blocked interrupt handler thread B awaits the end of the condition that caused it to block. When the synchronizing object controlling the sleep queue containing the sleeping thread B finally awakens thread B, the common interrupt code, which called the handler checks the "t_intr" field and finds it equal to "Null" indicating thread B was blocked. 188 Thread B completes its handling of the interrupt and upon completion, and if no other blocks occur, returns (158 in FIG. 7b), and the common interrupt code puts the interrupt handler thread back onto the pre-prepared interrupt handler thread pool for that CPU and returns control to the dispatcher to switch to the highest priority runnable thread available. (176 in FIG. 7b).

Figure 10:
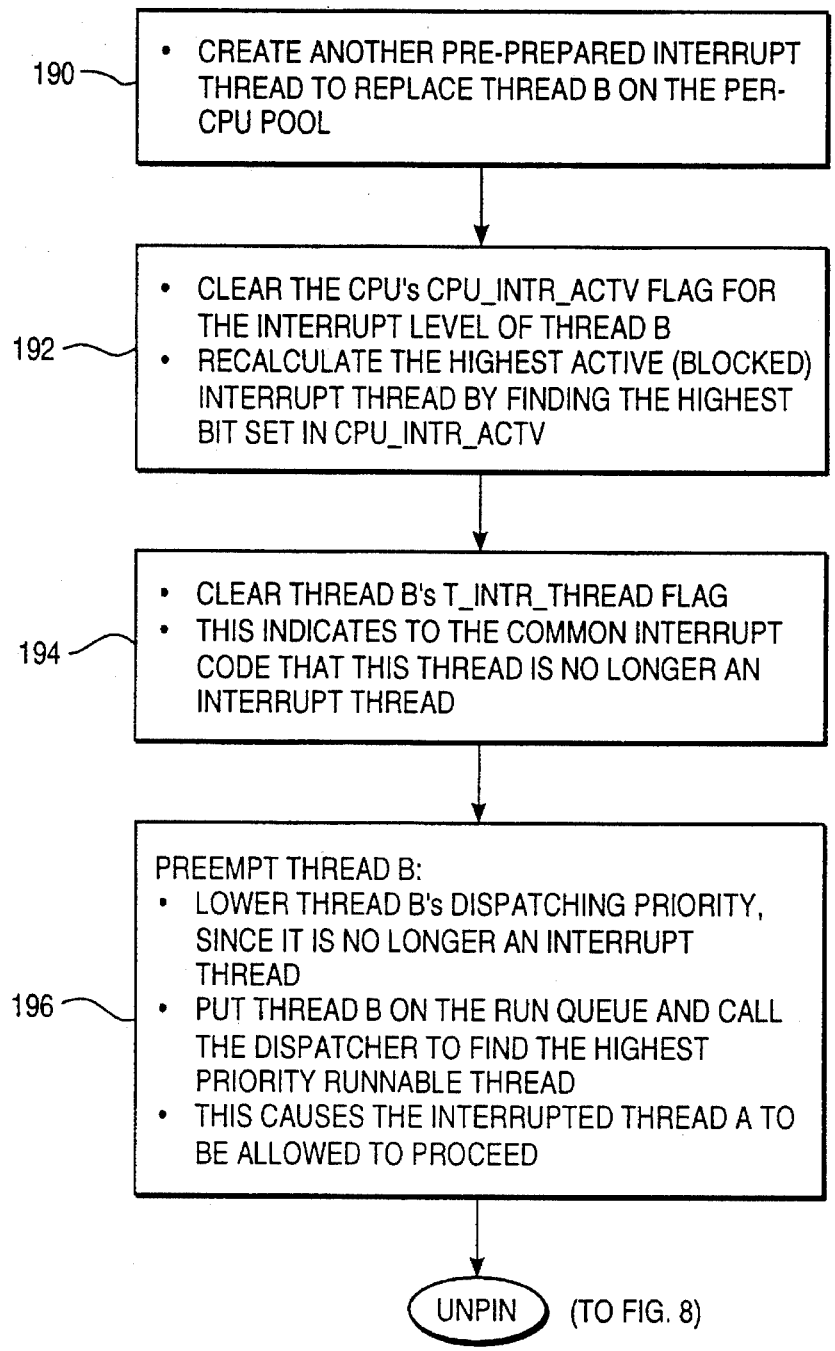

Under some conditions, the interrupt handler thread may wish to continue as a kernel thread without holding off further interrupts. Referring now to FIG. 10, the function "release_interrupt ()" may be called to allow the interrupt to be reenabled. This routine must replace the pre-prepared interrupt handler thread in the per-CPU pool 199 and convert calling thread B to a non-interrupt thread. The CPU's "cpu_intr_actv" flag is cleared of the interrupt level of thread B, 192, and thread B's "T_INTR_THREAD" flag is cleared, indicating to the common interrupt code that this thread is not an interrupt handler thread. 194. Since thread B is no longer an interrupt handler thread its dispatching priority is lowered and thread B is placed on the run queue to be subsequently activated by the dispatcher whenever appropriate. 196. "Release_interrupt" then calls "Thread_unpin" to unpin thread A to allow thread A to resume. See block 186 on FIG. 8 as described earlier. After unpinning thread A, "release_interrupt ()" will eventually return to block 154 on FIG. 7a and follows path 157, 160 (on FIG. 7b), to blocks 178, and 180 where this non-interrupt thread which remains is marked as a "zombie" telling the kernel to eventually free this thread.

Clock Interrupt.

The clock interrupt (142 in FIG. 6), which occurs 100 times a second on current Sun SPARC implementations, is handled specially. There is only one clock interrupt thread in the system (not one per CPU), and the clock interrupt handler invokes the clock handler thread only if it is not already active. The clock handler thread could possibly be delayed for more than one clock tick by blocking on a mutex or by higher-level interrupts. When a clock tick occurs and the clock thread is already active, the interrupt is cleared and a counter is incremented. If the clock handler thread finds the counter non-zero before it returns, it will decrement the counter and repeat the clock processing. This occurs very rarely in practice. When it occurs, it is usually due to heavy activity at higher interrupt levels. It can also occur while debugging.

Kernel Locking Strategy

The locking approach used almost exclusively in the kernel to ensure data consistency is data based locking. That is, the mutex and readerwriter locks each protect a set of shared data, as opposed to protecting routines (monitors). Every piece of shared data is protected by a synchronization object. Some aspects of locking in the virtual memory, file system, STREAMS, and device drivers are described in the above referenced paper in [Kleiman 1992]. An elaboration on device driver issues is pertinent, since the present invention using interrupt handler threads may be implemented in systems where the device-drivers have not been modified to use interrupt handler threads.

Non-MT Driver Support.

A "device driver" is a special subprogram to handle a specific I/O device. Some device drivers have not been modified to protect themselves against concurrency in a multithreaded environment. These drivers are called "MT-unsafe"; because they do not provide their own locking. In order to provide some interim support for MT-unsafe drivers, the preferred embodiment of the present invention provides wrappers that acquire a single global mutex, "unsafe_driver". These wrappers insure that only one such driver will be active at any one time. MT-unsafe drivers can also use the old sleep/wakeup mechanism. "Sleep ()" safely releases the "unsafe_driver" mutex after the thread is asleep, and reacquires it before returning. The "longjmp()" feature of "sleep()" is maintained as well. When a thread is signalled in "sleep ()", if it specified a dispatch value greater than PZERO, a "longjmp ()" takes the thread to a "setjmp ()" that was performed in the unsafe driver entry wrapper, which returns EINTR to the caller of the driver. "Sleep ()" checks to make sure it is called by an MT-unsafe driver, and panics if it isn't. It isn't safe to use "sleep ()" from a driver which does its own locking. There are several ways a driver may be entered, all of them have to get the "unsafe-driver" mutex if the driver isn't safe. For example, when an interrupt that is to be handled by an MT-unsafe driver occurs, the "unsafe_driver" mutex is acquired before the interrupt handler calls the driver's interrupt handler. In addition, if an MT-unsafe driver uses timeout to request a callback at a later time, the callout structure is marked so that the "unsafe_driver" mutex will be held during the callback. It is fairly easy to provide at least simple locking for a driver, so almost all drivers in the system have some of their own locking. These drivers are called "MT-Safe", regardless of how fine-grained their locking is. Some developers have used the term "MT-Hot" to indicate that a driver does fine-grained locking.

To the extent that UNIX International and USL Inc. have defined the SVR4 Multiprocessor Device Driver Interface and Driver Kernel Interface (DDI/DKI), SunOS 5.0 implements those interfaces as defined so far, using locking primitives and ignoring any spin semantics. This allows compatibility for SVR4 multiprocessor drivers.

Finally, since the kernel is fully preemptible in the present embodiment of the invention, kernel threads were made to time-slice. Code was simply added to the clock interrupt handler to preempt whatever thread was interrupted. This allows even a uniprocessor to have almost arbitrary code interleavings. Increasing the clock interrupt rate made this even more valuable in finding windows where data was unprotected. By causing kernel threads to preempt each other as often as possible, locking problems in the system can be found using uniprocessor hardware before multiprocessor hardware is available. This feature is intended only as a debugging feature, since it does have some adverse performance impact, however slight.

Additional detailed information concerning the invention may be found in the paper titled "Beyond Multiprocessing . . . Multithreading the System V Release 4 Kernel" by J. R. Eykholt, S. R. Kleiman, S. Barton, R. Faulkner, A. Shivalingiah, M. Smith, D. Stein, J. Voll, M. Weeks, and D. Williams, which is incorporated herein by reference and is attached hereto as Appendix A, and which is scheduled for its initial publication at USENIX, Summer '92, at San Antonio, Tex. on Jun. 8–12, 1992.

What is claimed is:

1. In a computer system having a central processing unit (CPU), with at least one executing thread which has a context, a method of processing interrupts to said CPU, performed by a computer, comprising the steps of:

a) recognizing a first external interrupt of said CPU, said first external interrupt causing said at least one executing thread to become an interrupted thread;

b) transferring execution control from said interrupted thread to a machine instruction corresponding to said first external interrupt; and c) activating a first interrupt handler thread to execute an interrupt service related to said first external interrupt, said interrupt service being completed without the use of a non-thread routine, said non-thread routine being one which is restricted to be runnable in a non-thread environment, said first interrupt handler thread synchronization primitives in lieu of locking-out other interrupts.

2. The method of claim 1 comprising the additional step of transferring execution control to a highest priority thread which is waiting to run, said transfer of execution control occurring upon completion of processing by said first interrupt handler thread.

3. The method of claim 1 further comprising the additional step of executing said first interrupt handler thread without saving the context of said interrupted thread.

4. The method according to claim 1 further comprising the steps of:
   a) recognizing that a condition has occurred wherein a second thread blocks the further execution of said first interrupt handler thread;
   b) performing by said blocked first interrupt handler thread the operations necessary to save a complete context of said interrupted thread;
   c) putting to sleep said blocked first interrupt handler thread until said blocking condition is cleared; and
   d) transferring execution control to a highest priority thread which is waiting to run.

5. The method according to claim 4 comprising the additional step of transferring by said blocked interrupt handler thread a dispatching priority level of said blocked interrupt handler thread to the second thread that is causing the block.

6. The method according to claim 1 wherein said first interrupt handler thread is a pre-prepared interrupt handler thread.

7. The method according to claim 1 wherein said computer system is a tightly-coupled multi-processor system having a plurality of CPUs.

8. A computer system having a CPU, with at least one executing thread which has a context, said at least one executing thread being processed by said CPU, said computer system comprising:
   a) a computer containing a first interrupt recognition mechanism for recognizing a first external interrupt of said CPU, said first external interrupt causing said at least one executing thread to become an interrupted thread;
   b) a first interrupt control mechanism, coupled to said first interrupt recognition mechanism for transferring execution control from the interrupted thread to a machine instruction corresponding to said first external interrupt; and
   c) an interrupt processing mechanism, coupled to said first interrupt control mechanism for activating a first interrupt handler thread to execute an interrupt service related to said first interrupt, said interrupt service being completed without the use of a non-thread routine, said non-thread routine being one which is restricted to be runnable in a non-thread environment, said first interrupt handler thread using thread synchronization primitives in lieu of locking-out other interrupts.

9. The computer system as recited in claim 8 further comprising a second interrupt control mechanism, coupled to said interrupt processing mechanism for transferring execution control to a highest priority thread that is waiting to run.

10. The computer system as recited in claim 9 further comprising:
   a) a second interrupt recognition mechanism portion of said CPU, for recognizing that a condition has occurred wherein a second thread blocks further execution of said first interrupt handler thread;
   b) a first processor device, coupled to said second interrupt recognition mechanism, for performing by said blocked first interrupt handler thread, operations necessary to save a complete context of said interrupted thread;
   c) a second processor device, coupled to said first processor device, for putting to sleep said blocked first interrupt handler thread until said blocking condition is cleared; and
   d) a first transfer device, coupled to said second processor device, for transferring execution control to a highest priority thread that is waiting to run.

11. The computer system recited in claim 10 further comprising a second transfer device coupled to said second processor device, for transferring by said blocked first interrupt handler thread a dispatching priority level of said blocked first interrupt handler thread to the second thread that is causing said block.

12. The computer system as recited in claim 8 further comprising a processing mechanism, coupled to said interrupt processing mechanism, for executing said first interrupt handler thread without saving the context of said interrupted thread.

13. The computer system recited in claim 8 wherein said first interrupt handler thread is a pre-prepared interrupt handler thread.

14. The computer system recited in claim 8 wherein said computer system is a tightly-coupled multi-processor system having a plurality of CPUs.

15. In a computer system having a CPU, with at least one executing thread which has a context, a method performed of processing interrupts to said CPU, performed by a computer, comprising the steps of:
   a) recognizing a first external interrupt of said CPU, said first external interrupt causing said at least one executing thread to become an interrupted thread;
   b) transferring execution control from said interrupted thread to a machine instruction corresponding to said first external interrupt;
   c) activating a first interrupt handler thread; and
   d) executing said first interrupt handler thread to perform an interrupt service related to said first external interrupt without saving said context of said interrupted thread if said first interrupt handler thread is not itself preempted before completing said interrupt service, said first interrupt handler thread using thread synchronization primitives in lieu of locking-out other interrupts whereby processing time is saved by not having to execute a context switch for every interrupt service and whereby other interrupts are not locked out for an unbounded period of time.

16. A computer system having a CPU, with at least one executing thread which has a context, said computer system comprising:
   a) a computer containing a first interrupt recognizing mechanism for recognizing a first external interrupt of said CPU, said first external interrupt causing said at least one executing thread to become an interrupted thread;
   b) a first interrupt control mechanism, coupled to said computer for transferring execution control from said interrupted thread to a machine instruction corresponding to said first interrupt;
   c) an interrupt processing mechanism, coupled to said first interrupt control mechanism for activating a first interrupt handler thread; and
   d) an interrupt handler thread mechanism, coupled to said interrupt processing mechanism for executing said first interrupt handler thread without saving said context of said interrupted thread if said first interrupt handler thread is not itself preempted before completing said interrupt service, said first interrupt handler thread using thread synchronization primitives in lieu of locking-out other interrupts whereby processing time is saved by not having to execute a context switch for every interrupt service and whereby other interrupts are not locked out for an unbounded period of time.

17. In a computer system having a CPU, with at least one executing thread which has a context, a method of processing interrupts to said CPU, performed by a computer, comprising the steps of:

a) recognizing a first external interrupt of said CPU, said first external interrupt causing said at least one executing thread to become an interrupted thread;

b) transferring execution control from said interrupted thread to a machine instruction executable by a computer, corresponding to said first external interrupt;

c) activating a first interrupt handler thread to execute an interrupt service related to said first external interrupt; and d) upon completion of said interrupt service related to said first external interrupt, transferring execution control to a highest priority thread that is waiting to run, instead of transferring execution control back to said interrupted thread.

18. In a computer system having a CPU, with at least one executing thread which has a context, a method of processing interrupts to said CPU, performed by a computer, comprising the steps of:

a) recognizing a first external interrupt of said CPU, said first external interrupt causing said at least one executing thread to become an interrupted thread;

b) transferring execution control from said interrupted thread to a machine instruction corresponding to said first external interrupt;

c) activating a first interrupt handler thread to execute an interrupt service related to said first external interrupt; and d) allowing said interrupt handler thread to use thread synchronization primitives in lieu of locking-out other interrupts thereby being adapted to be preempted by threads with higher dispatching priorities.

19. In a computer system having a central processing unit (CPU), with at least one executing thread which has a context, a method of processing interrupts to said CPU, performed by a computer, comprising the steps of:

a) recognizing a first external interrupt of said CPU, said first external interrupt causing said at least one executing thread to become an interrupted thread;

b) transferring execution control from said interrupted thread to a machine instruction corresponding to said first external interrupt;

c) activating a first interrupt handler thread to execute an interrupt service related to said first external interrupt, said first interrupt handler thread having its own program counter and context and adapted to use thread synchronization primitives in lieu of locking-out other interrupts, said first interrupt handler thread executing said interrupt service without saving said context of said interrupted thread thereby saving process or time;

d) recognizing that a condition has occurred wherein a second thread blocks the further execution of said first interrupt handler thread;

e) performing by said blocked first interrupt handler thread operations necessary to save said context of said interrupted thread and transferring a dispatching priority level of said blocked interrupt handier thread to the second thread that is causing the block;

f) putting to sleep said blocked first interrupt handler thread until said blocking condition is cleared; and g) transferring execution control to a highest priority thread which is waiting to run instead of returning control to said interrupted thread.

20. In a computer system having a central processing unit(CPU), with at least one executing thread which has a context, a method of processing interrupts to said CPU, performed by a computer comprising the steps of:

a) recognizing a first external interrupt of said CPU, said first external interrupt causing said at least one executing thread to become an interrupted thread;

b) transferring execution control from said interrupted thread to a machine instruction corresponding to said first external interrupt; and c) activating a first interrupt handler thread to execute an interrupt service related to said first external interrupt, wherein said first interrupt handler thread is a pre-prepared interrupt handler thread thereby saving processor time, said pre-prepared interrupt handler thread having a data structure and storage associated with a thread already set up but said pre-prepared interrupt handler thread being not runnable as a separate thread until said first external interrupt occurs which causes said activation of said first interrupt handler thread, whereby said use of said pre-prepared interrupt handler thread saves processing time needed to set up a data structure and storage for an interrupt handler thread.

* * * * *

UNITED STATES PATENT AND TRADEMARK OFFICE
CERTIFICATE OF CORRECTION

PATENT NO. : 5,515,538
DATED : May 7, 1996
INVENTOR(S) : Steven R. Kleiman It is certified that error appears in the above-identified patent and that said Letters Patent is hereby corrected as shown below:

On column 16, line 62, after the phrase "said first interrupt handler" and insert --thread using--.

On column 19, line 2, delete "handier" and insert --handler--.

On column 20, line 11, delete "process or" and insert --processor--.

On column 20, line 19, delete "handier" and insert --handler--.

Signed and Sealed this

Twenty-fifth Day of March, 1997

*Attest:*

BRUCE LEHMAN

*Attesting Officer*     Commissioner of Patents and Trademarks